United States Patent
Shan (10) Patent No.: US 10,556,487 B2
(45) Date of Patent: Feb. 11, 2020

(54) ACCUMULATING/RECEIVING DEVICE AND HEAT PUMP SYSTEM

(71) Applicant: DENSO CORPORATION, Kariya, Aichi-pref. (JP)

(72) Inventor: Zhiwei Shan, Farmington Hills, MI (US)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 15/448,655

(22) Filed: Mar. 3, 2017

(65) Prior Publication Data

US 2017/0267063 A1 Sep. 21, 2017

Related U.S. Application Data (60) Provisional application No. 62/310,095, filed on Mar. 18, 2016.

(51) Int. Cl.
*B60H 1/00* (2006.01)
*F25B 40/00* (2006.01)
(Continued)

(52) U.S. Cl.
CPC ....... *B60H 1/00921* (2013.01); *B60H 1/3229* (2013.01); *B60H 1/32281* (2019.05); *F25B 5/02* (2013.01); *F25B 5/04* (2013.01); *F25B 40/00* (2013.01); *B60H 2001/00928* (2013.01); *B60H 2001/00949* (2013.01);
(Continued)

(58) Field of Classification Search
CPC ...... B60H 1/00921; B60H 2001/00928; B60H 2001/00949; F25B 5/02; F25B 5/04; F25B 40/00; F25B 40/02; F25B 40/04; F25B 40/06; F25B 43/006; F25B 2339/044; F25B 2339/0444; F25B 2339/0446; F25B 2400/0415; F25B 2400/053; F25B 2400/16
See application file for complete search history.

(56) References Cited

U.S. PATENT DOCUMENTS 5,996,360 A * 12/1999 Tanaka ............... B60H 1/00907
62/159
6,604,576 B2 * 8/2003 Noda .................. B60H 1/00878
165/202

(Continued)

FOREIGN PATENT DOCUMENTS

JP   H05-196326 A    8/1993
JP   10297270 A  * 11/1998
(Continued)

*Primary Examiner* — Cassey D Bauer
*Assistant Examiner* — Miguel A Diaz (57) ABSTRACT

The present disclosure provides an accumulating/receiving device for a heat pump system. The accumulating/receiving device includes a body, an inlet, a first outlet, and a second outlet. The body defines therein a space. The body is disposed downstream of an outside heat exchanger. The inlet is connected to the outside heat exchanger through a first conduit. The first outlet is connected to an inside heat exchanger through a second conduit. The second outlet is connected, through a bypass conduit, to a third conduit. A liquid of the refrigerant flows out of the body through the first outlet in a cooling mode. A vapor of the refrigerant flows out of the body through the second outlet in a heating mode.

12 Claims, 5 Drawing Sheets

(51) Int. Cl.
*F25B 5/02* (2006.01)
*F25B 5/04* (2006.01)
*B60H 1/32* (2006.01)

(52) U.S. Cl.
CPC .............. *B60H 2001/00957* (2013.01); *F25B 2400/0409* (2013.01); *F25B 2400/053* (2013.01); *F25B 2400/13* (2013.01); *F25B 2400/16* (2013.01); *F25B 2400/23* (2013.01)

(56) References Cited

U.S. PATENT DOCUMENTS

| | | | | |
|---|---|---|---|---|
| 2002/0189270 | A1* | 12/2002 | Stensrud | F25B 41/043 62/217 |
| 2005/0081545 | A1* | 4/2005 | Gist | F25B 41/043 62/217 |
| 2005/0183432 | A1* | 8/2005 | Cowans | F25B 41/00 62/190 |
| 2005/0198993 | A1* | 9/2005 | Corrigan | B01D 53/0415 62/474 |
| 2006/0026981 | A1* | 2/2006 | Inaba | B60H 1/3222 62/238.6 |
| 2006/0168991 | A1* | 8/2006 | Harm | B60H 1/005 62/434 |
| 2009/0090129 | A1* | 4/2009 | Ikegami | F25B 13/00 62/500 |
| 2013/0186131 | A1* | 7/2013 | Guitar | B60H 1/00342 62/498 |
| 2015/0121939 | A1* | 5/2015 | Takeuchi | F25B 6/04 62/324.6 |
| 2015/0176868 | A1* | 6/2015 | Kayano | F25B 1/06 62/324.6 |
| 2015/0253045 | A1* | 9/2015 | Yamada | F25B 5/04 62/324.1 |
| 2015/0300706 | A1* | 10/2015 | Awa | F25B 29/003 62/324.6 |
| 2015/0308719 | A1 | 10/2015 | Gebbie et al. | |
| 2016/0200175 | A1* | 7/2016 | Nakajima | F25B 40/02 62/500 |
| 2016/0209094 | A1* | 7/2016 | Yokoyama | F25B 41/00 |
| 2017/0267063 | A1* | 9/2017 | Shan | B60H 1/00921 |
| 2018/0009291 | A1* | 1/2018 | Ohishi | B60H 1/22 |
| 2018/0201094 | A1* | 7/2018 | Kawano | F25B 13/00 |
| 2018/0222287 | A1* | 8/2018 | Mieda | B60H 1/00914 |
| 2018/0222289 | A1* | 8/2018 | Kawakubo | B60H 1/00485 |

FOREIGN PATENT DOCUMENTS

| | | | |
|---|---|---|---|
| JP | H10-297270 A | 11/1998 | |
| WO | WO-2013136693 A1 * | 9/2013 | ............... F25B 6/04 |
| WO | WO-2014057607 A1 * | 4/2014 | ............... F25B 5/04 |

\* cited by examiner

ACCUMULATING/RECEIVING DEVICE AND HEAT PUMP SYSTEM

CROSS-REFERENCE TO RELATED APPLICATIONS

This application claims the benefit of U.S. Provisional Application No. 62/310,095, filed on Mar. 18, 2016.

TECHNICAL FIELD

The present disclosure relates to an accumulating/receiving device and a heat pump system for a vehicle.

BACKGROUND

Heat pumps can be useful in a variety of applications. For example, heat pumps can be used in plug-in hybrid vehicles and electric vehicles for heating the passenger compartment. Heat pumps are particularly useful because they are more efficient than other heating systems, assemblies, and devices, such as electric heaters. Energy saved with a heat pump can be used to extend the driving range of the vehicle using the onboard battery in electric mode.

In such heat pump systems, an accumulator has been conventionally used in a refrigerant loop, specifically, at a position between an inside heat exchanger (evaporator) and a compressor to control refrigerant conditions before entering the compressor. At an upstream side of the inside heat exchanger, an orifice or an electronic expansion valve (EXV) are typically used to regulate the refrigerant flow into the inside heat exchanger.

However, EXVs are generally expensive as compared to other expansion devices, whereas orifices are only optimized for one working condition which may lead to low cooling efficiency.

SUMMARY

This section provides a general summary of the disclosure, and is not a comprehensive disclosure of its full scope or all of its features.

A first aspect of the present disclosure provides an accumulating/receiving device for a heat pump system for a vehicle. The accumulating/receiving device includes a body, an inlet, a first outlet, and a second outlet. The body defines therein a space to store a refrigerant. The body is disposed downstream of an outside heat exchanger outside of a passenger compartment of the vehicle. The inlet is connected to the outside heat exchanger through a first conduit. The first outlet is connected to an inside heat exchanger in the passenger compartment of the vehicle through a second conduit. The second outlet is connected, through a bypass conduit, to a third conduit connected to both the inside heat exchanger and a compressor. The bypass conduit bypasses the inside heat exchanger. A liquid of the refrigerant flows out of the body through the first outlet when the heat pump system is in a cooling mode. A vapor of the refrigerant flows out of the body through the second outlet when the heat pump system is in a heating mode.

A second aspect of the present disclosure provides a heat pump system for a vehicle. The heat pump system includes a refrigerant loop through which a refrigerant circulates, an inside heat exchanger, an outside heat exchanger, a compressor, an accumulating/receiving device, a first valve, a second valve, and a controller. The inside heat exchanger is disposed in a passenger compartment of the vehicle. The outside heat exchanger is disposed outside of the passenger compartment. The compressor circulates the refrigerant between the inside heat exchanger and the outside heat exchanger. The accumulating/receiving device is disposed downstream of the outside heat exchanger. The first valve is disposed upstream of the inside heat exchanger. The second valve is disposed downstream of the accumulating/receiving device. The controller switches the heat pump system between a heating mode and a cooling mode by controlling the first valve and the second valve.

The refrigerant loop includes a first conduit connected to both the outside heat exchanger and the accumulating/receiving device, a second conduit connected to both the accumulating/receiving device and the inside heat exchanger, a third conduit connected to the inside heat exchanger and the compressor, and a bypass conduit connected to the accumulating/receiving device and the third conduit to bypass the inside heat exchanger. The first valve is disposed in the second conduit. The second valve is disposed in the bypass conduit. The controller is configured to (i) control the first valve to close the second conduit and the second valve to open the bypass conduit during the heating mode and (ii) control the first valve to open the second conduit and the second valve to close the bypass conduit during the cooling mode.

DRAWINGS

The drawings described herein are for illustrative purposes only of selected embodiments and not all possible implementations, and are not intended to limit the scope of the present disclosure. In the drawings.

DETAILED DESCRIPTION

As follows, a plurality of embodiments of the present disclosure will be described with reference to drawings. It will be apparent to those skilled in the art from this disclosure that the following descriptions of the embodiments are provided for illustration only and not for the purpose of limiting the invention as defined by the appended claims and their equivalents. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

First Embodiment

Figure 1:
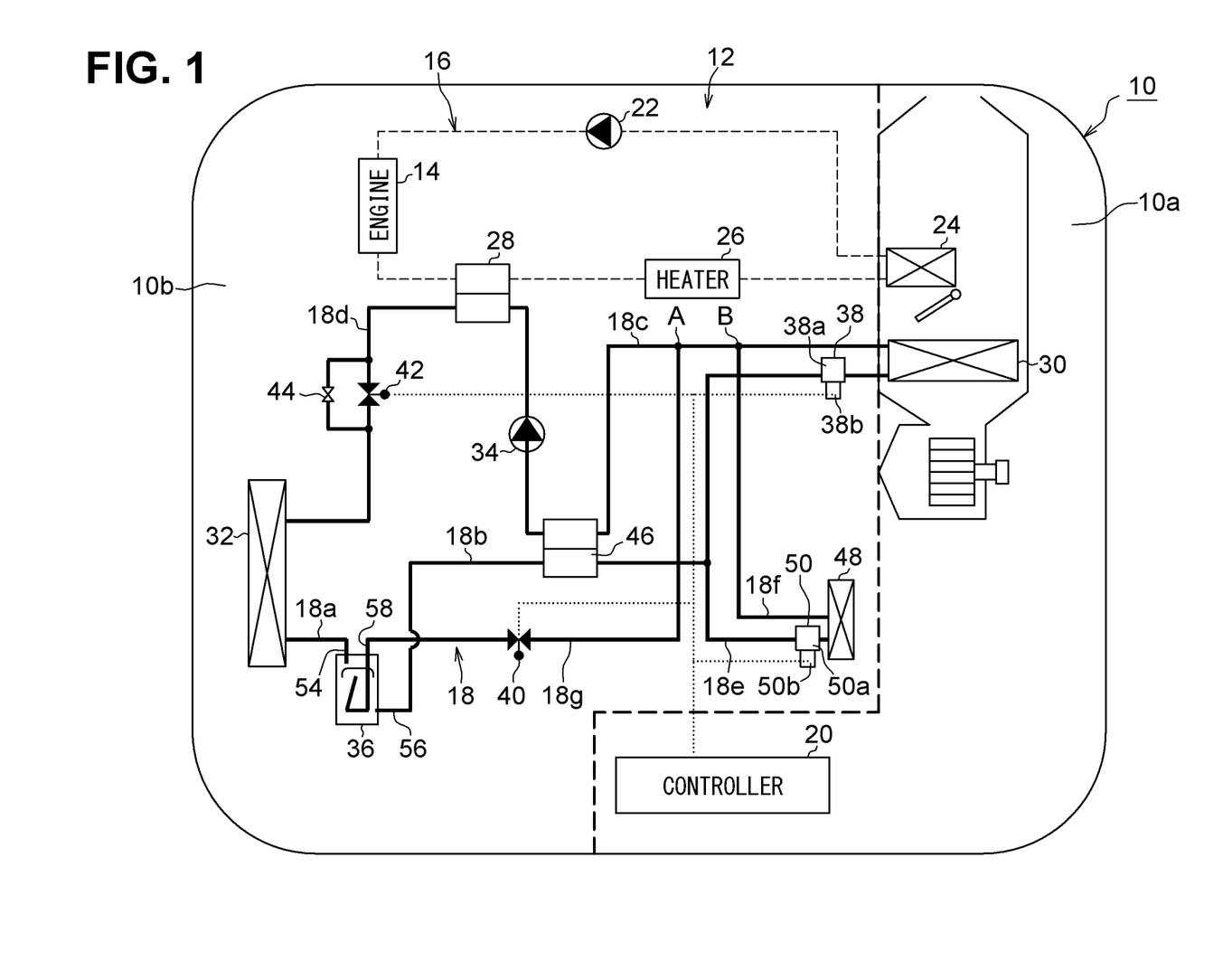
FIG. 1 is a schematic diagram of a vehicle to which a heat pump system according to a first embodiment is applied.

FIG. 1 schematically shows a vehicle 10 to which a heat pump system 12 according to the present embodiment is applied. In this embodiment, the vehicle 10 is a plug-in hybrid vehicle having an internal combustion engine (hereinafter, referred to as an "engine 14") and an electric motor (not shown). However, the heat pump system 12 of the present embodiment can be applied to any other types of vehicles such as an electric vehicle, a hybrid vehicle, a vehicle powered by only an engine, or the like.

The vehicle 10 includes a passenger compartment 10a designed for the seating of a driver and passengers and an engine compartment 10b in which the engine 14 is installed. The heat pump system 12 is installed across the engine compartment 10b and the passenger compartment 10a, as shown in FIG. 1.

The electric motor is installed in the engine compartment 10b. The vehicle 10 includes a battery (not shown) positioned behind the back seat, for example. The vehicle 10 may be propelled solely via the engine 14, solely via the electric motor, or by both the engine 14 and the electric motor. The engine 14 may be adapted to combust any suitable type of fuel, such as gasoline, diesel fuel, or hydrogen.

The heat pump system 12 is configured to circulate air and control the temperature in the passenger compartment 10a. The heat pump system 12 generally includes a coolant loop 16, a refrigerant loop 18, and a controller 20, as shown in FIG. 1. The operation mode of the heat pump system 12 is switched by the controller 20 between a cooling mode and a heating mode, as will be described below.

The coolant loop 16 circulates a fluid, such as coolant, to cool the engine 14 and, optionally, the electric motor. For example, waste heat generated from the engine 14 may be transferred to the coolant, whereby the engine 14 is cooled through the heat transfer. A coolant pump 22, a heater core 24, and a coolant heater 26 are arranged along the coolant loop 16. In the present embodiment, a portion of an intermediate heat exchanger 28 is also included in the coolant loop 16 as shown in FIG. 1. It should be noted that the coolant loop 16 may also include a radiator (not shown) disposed in the engine compartment 10b for transferring heat to the ambient air surrounding the vehicle 10.

The coolant pump 22 circulates coolant through the coolant loop 16. The coolant pump 22 may be powered by an electrical or non-electrical power source. The heater core 24 is disposed in the passenger compartment 10a and is configured to transfer heat from the coolant to air in the passenger compartment 10a. The heater core 24 may have any suitable configuration such as a plate-fin or tube-fin construction.

The coolant heater 26 may be optionally disposed to additionally heat the coolant. In at least one example, the coolant heater 26 may be an electrical coolant heater, such as a high voltage coolant heater or low voltage coolant heater.

The intermediate heat exchanger 28 is configured to facilitate the transfer of heat between the coolant loop 16 and the refrigerant loop 18. The intermediate heat exchanger 28 may be part of the coolant loop 16 and part of the refrigerant loop 18. In other words, the intermediate heat exchanger 28 is commonly shared by both the coolant loop 16 and the refrigerant loop 18. The intermediate heat exchanger 28 may have any suitable configuration. For instance, the intermediate heat exchanger 28 may have a plate-fin, tube-fin, or tube-and-shell configuration that may facilitate the transfer of heat without mixing the heat transfer fluids between the coolant and refrigerant loops 16, 18.

The refrigerant loop 18 is configured to circulate a refrigerant and transfer heat to/from the passenger compartment 10a and to/from the coolant loop 16 through the refrigerant.

In the present embodiment, an evaporator 30 (an inside heat exchanger), an outside heat exchanger 32, a compressor 34, an accumulating/receiving device 36, a first thermal expansion valve 38 (a first valve), a first solenoid valve 40 (a second valve), a second solenoid valve 42, an orifice 44 (an expansion device), and an internal heat exchanger 46 are arranged along the refrigerant loop 18. Furthermore, a battery chiller 48 and a second thermal expansion valve 50 (a third valve) are disposed in the refrigerant loop 18. In this embodiment, the refrigerant loop 18 is formed of a first conduit 18a, a second conduit 18b, a third conduit 18c, a fourth conduit 18d, a bypass conduit 18g, a first chiller conduit 18e, and a second chiller conduit 18f. As described above, a portion of the intermediate heat exchanger 28 is included in the refrigerant loop 18.

The compressor 34 is configured to pressurize and circulate the refrigerant through the refrigerant loop 18. The compressor 34 may be powered by an electrical or non-electrical power source. For example, the compressor 34 may be operatively coupled to the engine 14 via a belt or may be driven by the electric motor. The compressor 34 and the outside heat exchanger 32 are connected to each other through the fourth conduit 18d.

The intermediate heat exchanger 28 is disposed in the fourth conduit 18d immediately downstream of the compressor 34. Thus, the intermediate heat exchanger 28 transfers heat to the coolant loop 16 from the refrigerant flowing through the fourth conduit 18d during the heat mode. The orifice 44 and the second solenoid valve 42, which are parallel to each other, are arranged along the fourth conduit 18d.

The second solenoid valve 42 is attached to the fourth conduit 18d and is controlled by the controller 20 to selectively open and close the fourth conduit 18d. More specifically, the second solenoid valve 42 is controlled to open the fourth conduit 18d during the cooling mode, thereby allowing the refrigerant to pass through the second solenoid valve 42. As a result, the refrigerant bypasses the orifice 44. In contrast, the second solenoid valve 42 is controlled to close the fourth conduit 18d during the heating mode. As a result, the refrigerant is prevented from passing through the second solenoid valve 42. The orifice 44 is configured to cause a pressure drop in the refrigerant when the refrigerant passes through the orifice 44 during the heating mode.

The outside heat exchanger 32 is disposed in the engine compartment 10b (i.e., outside of the passenger compartment 10a). The outside heat exchanger 32 may have any suitable configuration. For instance, the outside heat exchanger 32 may have a plate-fin or tube-fin configuration that may facilitate the transfer of heat between the refrigerant and the ambient air.

Figure 2:
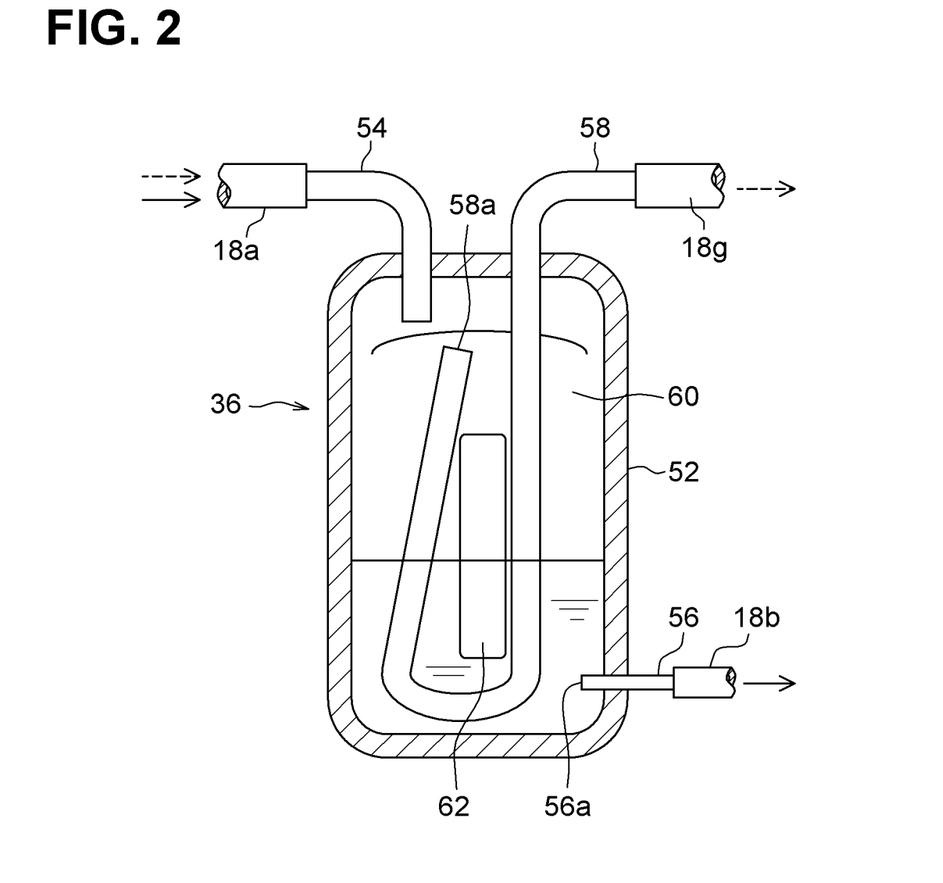
FIG. 2 is a cross-sectional view of a accumulating/receiving device.

The first conduit 18a is connected to both the outside heat exchanger 32 and the accumulating/receiving device 36. As shown in FIG. 2, the accumulating/receiving device 36 generally includes a body 52, an inlet 54, a first outlet 56, and a second outlet 58. The body 52 is formed of metal and defines therein a space 60 to store the refrigerant. The body 52 is configured to store a vapor of the refrigerant at an upper side of the space 60 and a liquid of the refrigerant at a lower side of the space 60. The inlet 54 is connected to one end of the first conduit 18a, and the refrigerant that has passed through the outside heat exchanger 32 flows into the body 52 through the inlet 54.

The first outlet 56 is formed in the body 52 and includes an opening 56a. The opening 56a of the first outlet 56 is open at the lower side of the space 60 to take in the liquid of the refrigerant. During the cooling mode, the liquid of the refrigerant flows out of the body 52 through the first outlet 56, as indicated by the solid arrow in FIG. 2. That is, the accumulating/receiving device 36 works as a receiver during the cooling mode.

The second outlet 58 is formed to have a curved shape and includes an opening 58a. The opening 58a of the second outlet 58 is open at the upper side of the space 60 to take in the vapor of the refrigerant. During the heating mode, the vapor of the refrigerant flows out of the body 52 through the second outlet 58, as indicated by the broken arrow in FIG. 2. That is, the accumulating/receiving device 36 works as an accumulator during the heating mode.

The accumulating/receiving device 36 further includes a desiccant 62 that is contained in a bag. The desiccant 62 is a substance that dries off the refrigerant by absorbing water. Therefore, the accumulating/receiving device 36 works as a dryer in the present embodiment.

The second conduit 18b is connected to both the accumulating/receiving device 36 and the evaporator 30, as shown in FIG. 1. A portion of the internal heat exchanger 46 and the first thermal expansion valve 38 (hereinafter, a "first TXV 38") are arranged along the second conduit 18b in this order in the flow direction of the refrigerant. One end of the second conduit 18b is connected to the first outlet 56, as shown in FIG. 2.

The first TXV 38 is positioned immediately upstream of the evaporator 30. In the present embodiment, the first TXV 38 includes a thermal expansion portion (TX portion) 38a and an on/off valve portion 38b, both of which are integrally formed with each other. The first TXV 38 (the on/off valve portion 38b) is controlled by the controller 20 to selectively open and close the second conduit 18b. When the on/off valve portion 38b is controlled to open the second conduit 18b, the refrigerant is allowed to pass through the TX portion 38a. The TX portion 38a is configured to cause a pressure drop in the refrigerant while the refrigerant is passing through the TX portion 38a. Conversely, the on/off valve portion 38b is controlled by the controller 20 to fully close the second conduit 18b during the heating mode to prevent the refrigerant from flowing into the evaporator 30.

The evaporator 30 is disposed in the passenger compartment 10a. The evaporator 30 is configured to cool air in the passenger compartment 10a during the cooling mode through the refrigerant flowing through the evaporator 30. The evaporator 30 may have any suitable configuration. For instance, the evaporator 30 may have a plate-fin or tube-fin configuration.

The third conduit 18c is connected to both the evaporator 30 and the compressor 34. A portion of the internal heat exchanger 46 is arranged along the third conduit 18c between the evaporator 30 and the compressor 34. That is, the internal heat exchanger 46 lies in the middle of both the second and third conduit 18cs. The internal heat exchanger 46 is optionally provided. The internal heat exchanger 46 is configured to transfer heat between the refrigerant flowing through the second conduit 18b and the refrigerant flowing through the third conduit 18c during the cooling mode. The internal heat exchanger 46 may have any suitable configuration. For instance, the internal heat exchanger 46 may have a plate-fin, tube-fin, or tube-and-shell configuration.

The bypass conduit 18g is connected to both the accumulating/receiving device 36 and the third conduit 18c. One end of the bypass conduit 18g is connected to the second outlet 58 of the accumulating/receiving device 36, as shown in FIG. 2. The connection point A of the bypass conduit 18g to the third conduit 18c is downstream of the evaporator 30 and upstream of the internal heat exchanger 46. Thus, the bypass conduit 18g bypasses the evaporator 30.

The first solenoid valve 40 is disposed in the bypass conduit 18g. The first solenoid valve 40 is controlled by the controller 20 to selectively open and close the bypass conduit 18g. During the heating mode, the first solenoid valve 40 is controlled to open the bypass conduit 18g to allow the refrigerant to bypass the evaporator 30. During the cooling mode, the first solenoid valve 40 is controlled to close the bypass conduit 18g to prevent the refrigerant from flowing through the bypass conduit 18g.

The battery chiller 48 may be a heat exchanger and is configured to cool the battery during the cooling mode. In the present embodiment, the battery chiller 48 is disposed in the engine compartment 10b to indirectly cool the battery through heat transfer between the refrigerant and a coolant flowing through a chiller loop (not shown). That is, the battery chiller 48 cools the coolant during the cooling mode, and then the battery is cooled by the coolant.

The first chiller conduit 18e is connected to both the second conduit 18b and the battery chiller 48. In other words, the first chiller conduit 18e is branched off from a middle position of the second conduit 18b and extends to the battery chiller 48. The second thermal expansion valve 50 (hereinafter, a "second TXV 50") is arranged along the first chiller conduit 18e at a position immediately upstream of the battery chiller 48. In the present embodiment, the second TXV 50 has substantially the same structure as the first TXV 38. That is, the second TXV 50 includes a thermal expansion portion (TX portion) 50a and an on/off valve portion 50b, which are integrally formed with each other. The on/off valve portion 50b is controlled by the controller 20 to selectively open and close the first chiller conduit 18e. When the on/off valve portion 50b is controlled to open the first chiller conduit 18e, the refrigerant is allowed to pass through the TX portion 50a. The TX portion 50a is configured to cause a pressure drop in the refrigerant while the refrigerant is passing through the TX portion 50a. In contrast, when the on/off valve portion 50b is controlled by the controller 20 to fully close the first chiller conduit 18e, the refrigerant is prevented from flowing into the battery chiller 48.

The second chiller conduit 18f is connected to both the battery chiller 48 and the third conduit 18c. The second chiller conduit 18f is connected to the third conduit 18c at a connection point B between the evaporator 30 and the internal heat exchanger 46. The connection point B is upstream of the connection point A of the third conduit 18c and the bypass conduit 18g in this present embodiment, but the second chiller conduit 18f may be connected to the third conduit 18c at a positon downstream of the connection point A.

The controller 20 is configured to control operation of the heat pump system 12. The controller 20 may be an electronic control unit and be formed of a memory (not shown) and a microprocessor (not shown). The memory may include a random access memory (RAM) and read-only memory (ROM) and store programs. The programs in the memory may be computer-readable, computer-executable software code containing instructions that are executed by the microprocessor.

In the present embodiment, the controller 20 is electrically connected to, at least, the first and second TXVs 38, 50 and the first and second solenoid valves 40, 42. The controller 20 switches operation mode of the heat pump system 12 between the cooling mode and the heating mode by controlling these valves 38, 50, 40, 42.

In the cooling mode (see FIG. 3), the controller 20 controls the first and second TXVs 38, 50 and the second solenoid valve 42 to open and controls the first solenoid valve 40 to close. The refrigerant compressed by the compressor 34 passes through the intermediate heat exchanger 28 and then passes through the second solenoid valve 42 without passing through the orifice 44. In the cooling mode, the outside heat exchanger 32 functions as a condenser and transfers heat from the refrigerant flowing through the outside heat exchanger 32 to an ambient air, thereby condensing the refrigerant into a liquid form from a vapor form.

Figure 3:
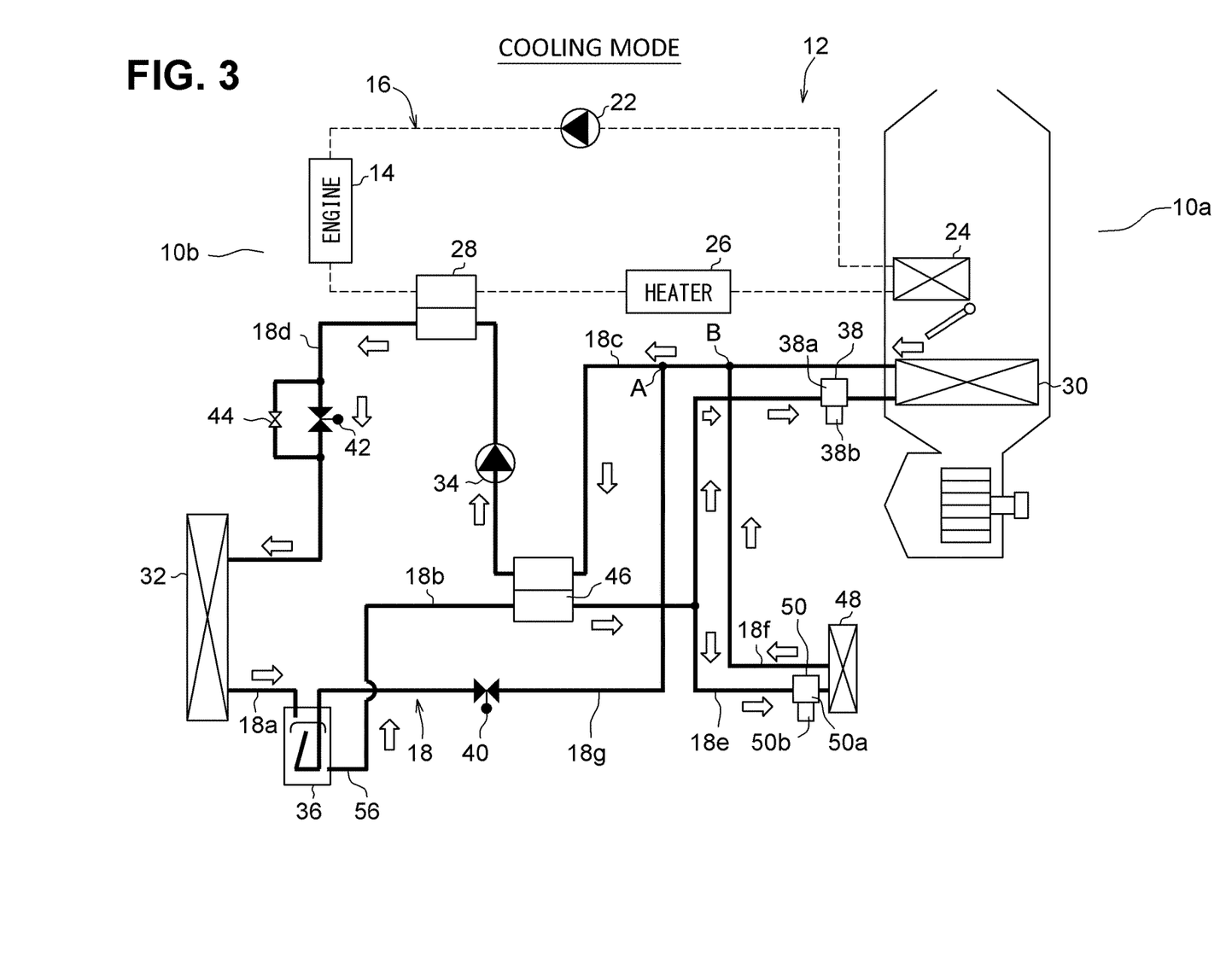
FIG. 3 is a diagram illustrating the heat pump system in a cooling mode.

The refrigerant in a liquid form flows into the accumulating/receiving device 36 through the inlet 54, and is stored in the space 60 of the body 52. Then, the liquid of the refrigerant exits the accumulating/receiving device 36 through the first outlet 56. At this time, since the opening 56a of the first outlet 56 is open at the lower side of the space 60, only the liquid of the refrigerant flows into the opening 56a. Therefore, the vapor of the refrigerant in the body 52 does not flow through the first outlet 56. In this way, the accumulating/receiving device 36 serves as a receiver during the cooling mode.

Furthermore, the desiccant 62 in the space 60 absorbs water contained in the refrigerant, and thus the accumulating/receiving device 36 also serves as a dryer.

The liquid of the refrigerant flows through the second conduit 18b and passes through the internal heat exchanger 46. At the internal heat exchanger 46, the refrigerant is further cooled. After passing through the internal heat exchanger 46, a portion of the refrigerant goes toward the evaporator 30 along the second conduit 18b, while the remaining portion of the refrigerant goes toward the battery chiller 48 through the first chiller conduit 18e.

At the first TXV 38 that is controlled to open, the flow of the refrigerant is restricted by the first TXV 38, and thus a pressure drop in the refrigerant occurs when the refrigerant passes through the first TXV 38. At the evaporator 30, the refrigerant receives heat from air in the passenger compartment 10a, whereby the air is cooled at the evaporator 30. In this way, the heat pump system 12 cools the passenger compartment 10a during the cooling mode.

The refrigerant exits the evaporator 30 as a superheated gas and passes through the internal heat exchanger 46 where the heat transfer occurs as described above. Then, the refrigerant returns back to the compressor 34 and circulated again by the compressor 34 after being compressed.

The refrigerant flowing through the first chiller conduit 18e reaches the second TXV 50. At the second TXV 50, a pressure drop occurs in the refrigerant and then the refrigerant vaporizes at the battery chiller 48. At the battery chiller 48, the refrigerant cools the coolant flowing through the chiller loop, and then the battery is cooled by the coolant. In this way, the heat pump system 12 also cools the battery during the cooling mode.

The refrigerant exiting the battery chiller 48 flows through the second chiller conduit 18f. Then, the refrigerant merges into the third conduit 18c and returns back to the compressor 34.

In the heating mode (see FIG. 4), the controller 20 controls the first and second TXVs 38, 50 and the second solenoid valve 42 to close and controls the first solenoid valve 40 to open. The refrigerant exiting the compressor 34 flows into the intermediate heat exchanger 28. At the intermediate heat exchanger 28, the refrigerant flowing through the intermediate heat exchanger 28 transfers heat to the coolant flowing through the coolant loop 16. Thus, the intermediate heat exchanger 28 functions as a condenser during the heating mode. The coolant heated at the intermediate heat exchanger 28 is further heated by the coolant heater 26, and then reaches the heater core 24. At the heater core 24, the coolant heats air in the passenger compartment 10a, thereby increasing a temperature in the passenger compartment 10a. In this way, the heat pump system 12 heats the passenger compartment 10a by transferring heat from the refrigerant loop 18 to the coolant loop 16 at the intermediate heat exchanger 28.

Figure 4:
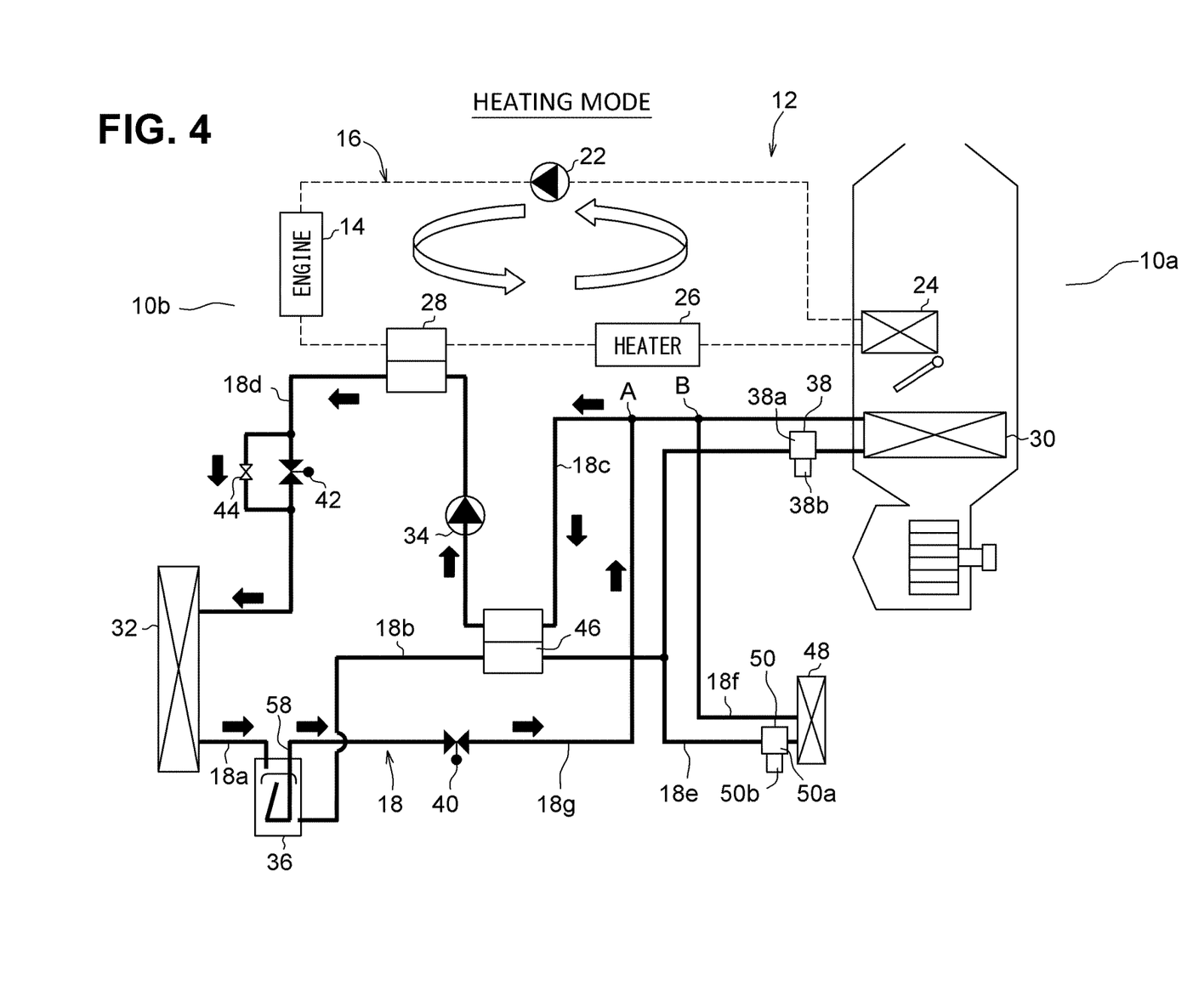
FIG. 4 is a diagram illustrating the heat pump system in a heating mode.

The refrigerant exiting the intermediate heat exchanger 28 flows through the orifice 44. At the orifice 44, a pressure drop occurs in the refrigerant. As such, the refrigerant exits the orifice 44 at a lower pressure in a liquid and vapor mixture form. During the heating mode, the outside heat exchanger 32 functions as an evaporator 30 and transfers heat from an ambient air to the refrigerant flowing through the outside heat exchanger 32. As a result, the refrigerant vaporizes at the outside heat exchanger 32.

The vaporized refrigerant enters the accumulating/receiving device 36 through the inlet 54. If the refrigerant is in a liquid-vapor mixture, then the liquid is separated from the vapor in the space 60 of the body 52. The vapor of the refrigerant exits the accumulating/receiving device 36 through the second outlet 58. In this case, the opening 58a of the second outlet 58 is open at the upper side of the space 60, and thus only the vapor of the refrigerant flows into the opening 58a of the second outlet 58. Accordingly, the liquid of the refrigerant is prevented from flowing out of the accumulating/receiving device 36.

In this way, the accumulating/receiving device 36 functions as an accumulator during the heating mode. Furthermore, the accumulating/receiving device 36 absorbs water in the refrigerant by the desiccant 62. Therefore, the accumulating/receiving device 36 functions as a dryer during the heating mode as well.

The vapor of the refrigerant flows through the bypass conduit 18g to bypass the evaporator 30. Then, the refrigerant merges into the third conduit 18c and returns back to the compressor 34 through the third conduit 18c.

As described above, the accumulating/receiving device 36 includes the first outlet 56 and the second outlet 58 and functions as either a receiver during the cooling mode or an accumulator during the heating mode.

If an accumulator is used between the compressor 34 and the evaporator 30 to control compressor suction conditions as a conventional system, either an electronic expansion valve (EXV) or a fixed orifice tube (FOT) would be used as an expansion device (i.e., a TXV cannot be used). This is because in a system where a TXV is used at an upstream side of the evaporator 30, the refrigerant flowing out of the evaporator 30 would be a superheated gas. If such a superheated refrigerant flows into the accumulator, a liquid of the refrigerant in the accumulator would be caused to evaporate and flow out of the accumulator. As a result, the liquid of the refrigerant originally inside the accumulator will be all evaporated and accumulated in the outside heat exchanger 32, which may reduce heat transfer performance of the outside heat exchanger 32.

Furthermore, the reduced heat transfer performance of the outside heat exchanger 32 will cause the pressure at the outlet of the compressor 34 to increase, which increases the power usage of the compressor 34 and reduces the cooling efficiency of the entire refrigeration system. In the worst scenario, system failure may occur due to the overpressure of the compressor 34. For these reasons, only an EXV or a FOT is conventionally used for a system that has an accumulator between the compressor and the evaporator. However, EXVs are generally expensive than TXVs, meanwhile FOTs are only optimized for one working condition and thus cooling efficiency would be low for other working conditions.

In view of the above, by using the accumulating/receiving device 36 at a position between the outside heat exchanger 32 and the evaporator 30, the heat pump system 12 according to the present embodiment now eliminates an accumulator between the compressor 34 and the evaporator 30. Therefore, the first TXV 38, which is generally cheaper than an electronic expansion valve, can be used at an upstream side of the evaporator 30. Similarly, the second TXV 50 can be used due to the existence of the accumulating/receiving device 36 between the outside heat exchanger 32 and the battery chiller 48. Therefore, cost for the heat pump system 12 can be reduced as compared to a situation where EXVs are used, while energy efficiency and cooling performance can be improved as compared to a situation where FOTs are used.

Second Embodiment

Figure 5:
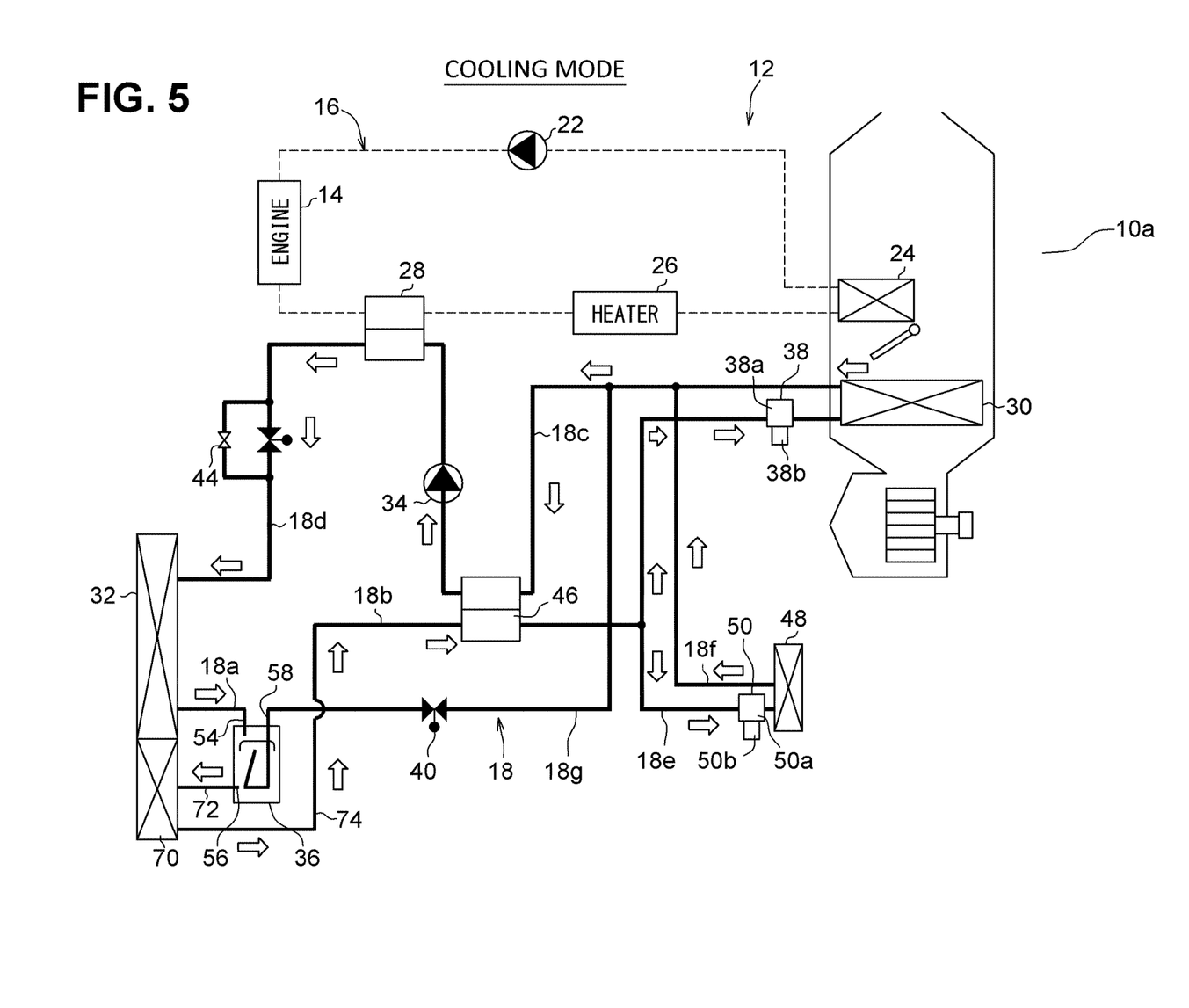
FIG. 5 is a diagram illustrating a heat pump system according to a second embodiment in a cooling mode.

FIG. 5 shows a heat pump system 12 according to the second embodiment. In this embodiment, the heat pump system 12 further includes a sub-cooling heat exchanger 70. In the present embodiment, the sub-cooling heat exchanger 70 is integrally formed with the outside heat exchanger 32, but it may be separately formed with the outside heat exchanger 32. The sub-cooling heat exchanger 70 may have the same structure as the outside heat exchanger 32. For example, the outside heat exchanger 32 may have a plate-fin or tube-fin configuration that may facilitate heat transfer between the refrigerant and the ambient air.

The sub-cooling heat exchanger 70 is arranged along the second conduit 18b. More specifically, the second conduit 18b in the present embodiment includes an upstream-side conduit 72 and a downstream-side conduit 74. The upstream-side conduit 72 is connected to both the accumulating/receiving device 36 and the sub-cooling heat exchanger 70. That is, one end of the upstream-side conduit 72 is connected to the first outlet 56. The downstream-side conduit 74 is connected to both the sub-cooling heat exchanger 70 and the evaporator 30 (through the internal heat exchanger 46 and the first TXV 38).

In the cooling mode, the liquid of the refrigerant exiting the accumulating/receiving device 36 through the first outlet 56 flows into the sub-cooling heat exchanger 70 through the upstream-side conduit 72. The liquid refrigerant is further cooled while flowing through the sub-cooling heat exchanger 70. As a result, the refrigerant flows out of the sub-cooling heat exchanger 70 as a subcooled liquid and goes to the evaporator 30 through the downstream-side conduit 74.

As described above, the accumulating/receiving device 36 works as a receiver during the cooling mode so that only the liquid of the refrigerant can exit the accumulating/receiving device 36 through the first outlet 56. Hence, the sub-cooling heat exchanger 70 can be used downstream of the accumulating/receiving device 36. Since, the liquid refrigerant is further cooled at the sub-cooling heat exchanger 70 to be a subcooled liquid, cooling efficiency of the heat pump system 12 can be improved.

It should be noted, during the heating mode, only the vapor of the refrigerant flows out of the accumulating/receiving device 36 through the second outlet 58 and the liquid of the vapor does not flow into the sub-cooling heat exchanger 70 through the first outlet 56.

Other Embodiments

In the above-described embodiments, the first TXV 38 (i.e., the first valve) is formed of the TX portion 38a and the on/off valve portion 38b which are integrally formed with each other. Alternatively, the first TXV 38 may by configured with the TX portion 38a and the on/off valve portion 38b which are separately formed with each other. In this case, the on/off valve portion 38b is disposed at an upstream side of the TX portion 38a to selectively close and open the third conduit 18c.

Similarly, the second TXV 50 (i.e., the third valve) may be configured with the TX portion 50a and the on/off valve portion 50b which are separately formed with each other. In this case, the on/off valve portion 50b is disposed in the first chiller conduit 18e at an upstream side of the TX portion 50a.

In the above-described embodiments, the orifice 44 as the expansion device and the second solenoid valve 42 are used between the intermediate heat exchanger 28 and the outside heat exchanger 32. Alternatively, an electronic expansion valve may be used as the expansion device at a position between the intermediate heat exchanger 28 and the outside heat exchanger 32.

The outside heat exchanger 32 may have a plurality of cores that are arranged along a vertical direction of a vehicle 10. For example, when the outside heat exchanger 32 includes two cores, the flow direction of the refrigerant in one of the two cores may be opposite to the flow direction of the refrigerant in the other of the two cores.

In the above-described embodiments, the connection points A and B are positioned between the internal heat exchanger 46 and the evaporator 30. Alternatively, the connection point A and/or B may be positioned between the compressor 34 and the internal heat exchanger 46. In other words, the connection points A and B may be at any positions as long as the two points A and B are positioned between the compressor 34 and the evaporator 30.

In the above-described embodiments, the battery chiller 48 indirectly cools the battery. Alternatively, the battery chiller 48 may be configured to directly cool the battery. Further, the battery chiller 48 may be eliminated.

In the above-described embodiments, the coolant flowing through the coolant loop 16 is heated by the refrigerant flowing through the refrigerant loop 18 at the intermediate heat exchanger 28, and then air in the passenger compartment 10a is heated by the coolant at the heater core 24. In other words, the refrigerant loop 18 indirectly heats the air in the passenger compartment 10a. Alternatively, the refrigerant loop 18 may directly heat air in the passenger compartment 10a. For example, the fourth conduit 18d extends to the passenger apartment 10a and the heater core 24 is disposed along the fourth conduit 18d. As a result, air in the passenger compartment 10a is heated by the refrigerant, which was heated by the compressor 34, through heat transfer between the refrigerant flowing through the heater core 24 and the air.

In the above-described embodiments, the second outlet 58 has a curved shape and the opening 58a is formed at one end of the second outlet 58. Alternatively, the second outlet 58 may extend linearly. In this case, the opening 58a of the second outlet 58 may be formed in the wall of the second outlet 58.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A heat pump system for a vehicle, the heat pump system comprising:
    a refrigerant loop through which a refrigerant circulates;
    an inside heat exchanger that is disposed in a passenger compartment of the vehicle;
    an outside heat exchanger that is disposed outside of the passenger compartment;
    a compressor that circulates the refrigerant between the inside heat exchanger and the outside heat exchanger;
    an accumulator/receiver device that is disposed downstream of the outside heat exchanger;
    a first valve that is disposed upstream of the inside heat exchanger and downstream of the accumulator/receiver device;
    a second valve that is disposed downstream of the accumulator/receiver device and upstream of the compressor;
    an intermediate heat exchanger that is disposed directly downstream of the compressor and upstream of the outside heat exchanger; and
    a controller that switches the heat pump system between a heating mode and a cooling mode by controlling the first valve and the second valve, wherein:
        the refrigerant loop includes a first conduit connected to both the outside heat exchanger and the accumulator/receiver device, a second conduit connected to both the accumulator/receiver device and the inside heat exchanger, a third conduit connected to both the inside heat exchanger and the compressor, a fourth conduit connected to both the compressor and the outside heat exchanger, and a bypass conduit connected to the accumulator/receiver device and the third conduit to bypass the inside heat exchanger,
        the first valve is disposed in the second conduit,
        the second valve is disposed in the bypass conduit,
        the intermediate heat exchanger is disposed in the fourth conduit and configured to transfer heat between the refrigerant loop and a coolant loop during the heating mode, and
        the controller is configured to (i) control the first valve to close the second conduit and the second valve to open the bypass conduit during the heating mode and (ii) control the first valve to open the second conduit and the second valve to close the bypass conduit during the cooling mode.

2. The heat pump system according to claim 1, further comprising
    a sub-cooling heat exchanger that is disposed in the second conduit upstream of the first valve.

3. The heat pump system according to claim 1, wherein the first valve includes a thermal expansion portion and an on/off valve portion.

4. The heat pump system according to claim 1, wherein coolant circulates through the coolant loop; and
    a heater core that is disposed in the passenger compartment of the vehicle.

5. The heat pump system according to claim 1, further comprising:
    a battery chiller;
    a first chiller conduit;
    a second chiller conduit; and
    a third valve that is disposed upstream of the battery chiller, wherein
        the first chiller conduit is branched off from the second conduit and connected to the battery chiller,
        the second chiller conduit is connected to both the third conduit and the battery chiller,
        the third valve is disposed in the first chiller conduit, and
        the controller controls the third valve to open the first chiller conduit during the cooling mode and to close the first chiller conduit during the heating mode.

6. The heat pump system according to claim 5, wherein the third valve includes a thermal expansion portion and an on/off valve portion.

7. The heat pump system according to claim 1, further comprising
    an expansion device that is disposed in the fourth conduit between the intermediate heat exchanger and the outside heat exchanger.

8. The heat pump system according to claim 7, wherein the expansion device is an orifice.

9. The heat pump system according to claim 7, wherein the expansion device is an electronic expansion valve.

10. The heat pump system according to claim 1, wherein the accumulator/receiver device includes:
    a body that defines therein a space to store the refrigerant;
    an inlet that is connected to the first conduit;
    a first outlet that is connected to the second conduit; and a second outlet that is connected to the bypass conduit,
a liquid of the refrigerant flows out of the body through the first outlet during the cooling mode, and
a vapor of the refrigerant flows out of the body through the second outlet during the heating mode.

11. The heat pump system according to claim 10, wherein
the first outlet has an opening that is open at a lower side of the space, and
the second outlet has an opening that is open at an upper side of the space.

12. The heat pump system according to claim 10, wherein the accumulator/receiver device includes a desiccant that is disposed in the space of the body to absorb water.

* * * * *